: US005534574A

United States Patent [19]

Sandstrom et al.

[11] Patent Number: 5,534,574
[45] Date of Patent: Jul. 9, 1996

[54] SILICA REINFORCED RUBBER PREPARATION AND TIRE WITH TREAD THEREOF

[75] Inventors: Paul H. Sandstrom, Tallmadge; David J. Zanzig, Uniontown; Mark S. Sinsky, Akron, all of Ohio

[73] Assignee: The Goodyear Tire & Rubber Company, Akron, Ohio

[21] Appl. No.: 401,844

[22] Filed: Mar. 10, 1995

[51] Int. Cl.$^6$ ............................... C08K 5/54; C08K 3/36
[52] U.S. Cl. .................... 524/262; 524/265; 524/267; 524/493; 524/495; 525/316; 152/209 R
[58] Field of Search ................... 524/262, 265, 524/267, 493, 492, 495; 152/209 R; 525/316

[56] References Cited

U.S. PATENT DOCUMENTS

| 3,873,489 | 3/1975 | Thurn et al. | 524/262 |
| 3,938,574 | 2/1976 | Burmester et al. | 524/262 |
| 4,430,466 | 2/1984 | Cooper | 524/262 |
| 5,087,668 | 2/1992 | Standstrom et al. | 525/237 |
| 5,162,409 | 11/1992 | Mroczkowski | 524/262 |
| 5,227,425 | 7/1993 | Rauline | 525/99 |

*Primary Examiner*—Paul R. Michl
*Assistant Examiner*—Olga Asinovsky
*Attorney, Agent, or Firm*—Henry C. Young, Jr.

[57] ABSTRACT

A rubber composition comprised of elastomer, silica, a silica coupler, 2-mercaptobenzothiazole and, optionally, carbon black, in which the silica, silica coupler and at least a portion of the 2-mercaptobenzothiazole are added in a non-productive mix stage.

Pneumatic tires having treads comprised of such rubber composition are provided.

11 Claims, No Drawings

SILICA REINFORCED RUBBER PREPARATION AND TIRE WITH TREAD THEREOF

FIELD

This invention relates to rubber compositions which contain silica reinforcement which uses a silica coupling agent and particularly to a method of preparation thereof.

The invention also relates to a tire having a tread of such composition, including a method of preparation thereof.

BACKGROUND

For various applications utilizing rubber which requires high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires.

Carbon black is often considered a more effective reinforcing filler for rubber products, and particularly for rubber tire treads than silica if the silica is used without a coupling agent, or silica coupler as it may be sometimes referred to herein.

Various materials have been used as silica couplers, sometimes also known as coupling agents or adhesives, to overcome such deficiencies of silica for a purpose of reinforcing rubber compositions. Generally such silica couplers are compounds having a capability of reacting with both the silica surface and with a sulfur vulcanizable rubber elastomer molecule. A sulfur vulcanizable rubber is normally considered an elastomer which contains carbon-to-carbon unsaturation which will conventionally undergo sulfur vulcanization because of such unsaturation, normally through a carbon atom adjacent to a carbon atom which is double bonded to another carbon atom. It is believed that such vulcanization is well known to those skilled in such art.

The silica coupling agents may, for example, sometimes be premixed, or pre-reacted, with the silica particles or added to the rubber mix during the rubber/silica processing, or mixing, stage. If the coupling agent and silica are added separately to the rubber mix during the rubber/silica processing, or mixing, stage, it is considered that the coupling agent then combines in situ with the silica and with the rubber.

In one aspect, such coupling agents may be composed of an organosilane polysulfide which has a constituent component, or moiety, (the silane portion) capable of reacting with the silica surface and, also, a constituent component, or moiety, (the polysulfide portion) capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In another aspect, the silane of the coupling agent apparently forms a bond to the silica surface, rather quickly during the rubber/silica mixing process and the rubber reactive component of the coupling agent combines with the rubber at a much slower rate. The rubber reactive component of the coupler is generally temperature sensitive and tends to combine with the rubber rather slowly during the rubber mixing steps and more completely during the higher temperature sulfur vulcanization stage.

An example of such coupling agents for use in combining silica and rubber is, for example, an organosilane polysulfide such as bis-(3-trialkoxysilylalkyl) polysulfide where the sulfide bridge contains 2 to 8 connecting sulfur atoms in which the average polysulfide bridge contains about 4.5 to about 5.5 sulfur atoms so that the polysulfide may be more generally referred to as a tetrasulfide and, further, in which not more than 25 percent of the polysulfide bridge portion contains 2 or less sulfur atoms. In other words, such polysulfide predominately 3 or more connecting sulfur atoms in its polysulfide bridge portion. An example of such commercially available silica coupler is Si69 manufactured by the Degussa AG company.

Various, although not exhaustive, patents relating to silicas and silica reinforced tire treads include U.S. Pat. Nos. 3,451,458; 3,664,403; 3,768,537; 3,884,285; 3,938,574; 4,482,663; 4,590,052; 5,089,554 and British 1,424,503.

U.S. Pat. No. 4,513,123 discloses a rubber composition containing dithiodipropionic acid with natural rubber, or blends of natural and synthetic rubbers, 30–80 parts carbon black, sulfur and organo-cobalt compound for use as skim stock for brass-plated steel. It relates that the rubber composition can contain other additives such as fillers such as clays, silicas or calcium carbonate, process and extender oils, antioxidants, cure accelerators, cure activators, cure stabilizers and the like.

In sulfur curable rubber compositions, the ingredients are conventionally blended in several stages, referred to as "non-productive mix stage(s)" followed by a final "productive mix stage" in which curatives such as sulfur and cure accelerators are added. The non-productive mix stage(s), which are conventionally 1 or 2 to 4 or more sequential mix stages when more than one stage is utilized, are typically conducted at temperatures in a range of about 140° C. to 190° C. and the productive mix stage may conventionally be conducted at temperatures in a range of about 100° C. to 130° C. The aforesaid curatives are conventionally only added in the final, lower temperature, mix stage to keep the rubber from prematurely curing at the aforesaid elevated mix temperatures of the non-productive mix stages.

While, conceivably, a cure accelerator might be added in a non-productive stage, the inventors are not aware of any circumstance where a cure accelerator such as 2-mercaptobenzothiazole or cure accelerator containing 2-mercaptobenzothiazole such as, for example, sulfenamides, had been added to a rubber/silica/silica coupler blend in a non-productive mix stage prior to a productive mix stage where the sulfur is added.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to rubber which has been blended or mixed with various ingredients and materials and such terms are well known to those having skill in the rubber mixing or rubber compounding art.

SUMMARY AND PRACTICE OF THE INVENTION

In accordance with this invention, a rubber composition is prepared by a process which comprises the sequential steps of:

(A) thermomechanically mixing in at least one individual preparatory mixing step, in the absence of sulfur and sulfur vulcanization accelerators except as hereinafter provided, at a temperature in a range of about 140° C. to about 190° C. for a total mixing time of about 4 to about 20, alternatively about 4 to about 12, minutes (i) 100 parts by weight of at least one sulfur vulcanizable elastomer selected from conjugated diene homopolymers and copolymers and from copolymers of at least one conjugated diene and aromatic vinyl compound, (ii) about 15 to about 100 phr of particulate precipitated silica, (iii) about 0.01 to about 0.2 parts by weight per part by weight of said silica of a bis-(3-trialkoxysilylalkyl) polysulfide where the sulfide bridge portion contains 2 to 8 connecting sulfur atoms in which the average polysulfide bridge contains about 4.5 to about 5.5 sulfur atoms and in which at least 75 percent of the polysulfide bridge portion contains at least 3 sulfur atoms, and (iv) about 0.01 to about one part by weight of at least one of 2-mercaptobenzothiazole, benzothiazyl disulfide, and N,N'-di, or N-mono, substituted 2-benzothiazole sulfenamides wherein the substituents are selected from cyclohexyl, tertiary butyl, and isopropyl groups per part of said bis-(3-trialkoxysilylalkyl) polysulfide.

(B) subsequently blending therewith in a final, individual thermomechanical mixing step at a temperature in a range of about 100° C. to about 130° C. for a time of about 1 to about 3 minutes, about 0.5 to about 8 phr elemental sulfur and at least one sulfur vulcanization accelerator, provided, however, that the total of sulfur vulcanization accelerator added to the rubber mixture, including the aforesaid 2-mercaptobenzothiazole added in a preparatory mixing stage(s) is in a range of about 1.0 to about 10 phr.

In one aspect of the invention, rubber composition is provided which is prepared according to such method which is comprised of (A) 100 parts by weight of at least one diene-based elastomer, (B) about 25 to about 90 phr particulate silica, (C) about zero to about 80 phr carbon black, (D) a bis-(3-triethoxysilylpropyl) polysulfide silica coupler and (E) 2-mercaptobenzothiazole; wherein the weight ratio of said silica coupler to silica is in a range of about 0.01/1 to about 0.2/1; wherein the weight ratio of silica to carbon black, where the rubber composition contains carbon black, is at least about 0.1/1 and wherein the total of silica and carbon black, where the rubber composition contains carbon black, is in a range of about 30 to about 120.

In further accordance with this invention, the method comprises the additional step of vulcanizing the prepared rubber composition at a temperature in a range of about 135° C. to about 180° C.

A vulcanized rubber composition prepared thereby is also provided according to such method.

In additional accordance with this invention, the method comprises the additional steps of preparing an assembly of a tire of sulfur vulcanizable rubber with a tread of the said rubber composition and vulcanizing the assembly at a temperature in a range of about 135° C. to about 180° C.

A vulcanized tire prepared thereby is also provided according to such method.

The rubber composition, as hereinbefore referenced, is cured, or vulcanized, at an elevated temperature such as, for example, about 135° C. to about 180° C. Actually the rubber is usually shaped and cured in a suitable mold, generally under pressure, to form a rubber product.

Generally, in practice, the said individual rubber mixing steps are conducted in internal rubber mixers at the aforesaid temperatures with the rubber compositions being "batched off" at the end of each of such mixing steps onto an open mill composed of opposing rotating metal cylinders where the rubber composition is relatively mildly blended for a few minutes and the rubber removed therefrom in a form of a sheet which is usually allowed to cool to a temperature below 40° C. before the next internal mixing step.

The aforesaid recited cumulative mixing time is the mixing duration in the aforesaid internal mixer(s).

In further accordance with this invention, a rubber composition is similarly prepared where the preparatory steps (A) are composed of at least one sequential internal mixer mixing step, where (i) the rubber, silica, silica coupler and 2-mercaptobenzothiazole and/or 2-mercaptobenzothiazole moiety containing accelerator are added in the same mixing step, or (ii) the rubber, silica and silica coupler are added in the same mixing step and the 2mercaptobenzothiazole is added in a subsequent preparatory non-productive mixing step.

Where the rubber composition contains both silica and carbon black reinforcing pigments and it is desired that it be primarily reinforced with silica as the reinforcing pigment, it is often preferable that the weight ratio of silica to carbon black is at least 3/1, preferably at least 10/1 and preferably in a range of about 3/1 to about 30/1.

In further accordance with this invention, a rubber composition is provided having been prepared according to the method of this invention.

In additional accordance with this invention, a tire is provided having a tread of such composition.

The 2-mercaptobenzothiazole is considered herein to be particularly advantageous for the practice of this invention because it effects a more efficient usage of the silane coupling agent which is considered to be beneficial to allow for shorter mixing times and/or the use of less coupling agent.

The 2-mercaptobenzothiazole can be used as is or generated during mixing by using a sulfenamide type accelerator which will thermally split into an amine and the 2-mercaptobenzothiazole.

In one aspect, such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Thus, it is considered that the elastomer is a sulfur curable elastomer. Such elastomer may be, for example, a homopolymer or copolymer of at least one conjugated diene and/or copolymer of at least one conjugated diene and a vinyl aromatic compound. Such dienes may be, for example, one or more of isoprene and 1,3-butadiene and such vinyl aromatic compound may be, for example, styrene or alphamethylstyrene. Such elastomers may be selected, for example, from at least one of cis 1,4-polyisoprene rubber (natural and/or synthetic, and preferably natural rubber), 3,4-polyisoprene rubber, isoprene/ butadiene copolymer rubber, styrene/butadiene copolymer rubbers, styrene/isoprene/butadiene terpolymer rubbers, and cis 1,4-polybutadiene rubber and medium vinyl polybutadiene rubber (30–50 percent vinyl) and high vinyl polybutadiene rubber (50–75 percent vinyl).

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black if used, reinforcing filler(s) to contribute a reasonably high modulus and high resistance to tear. The combined weight of the silica and carbon black, as hereinbefore referenced, may be as low as about 30 parts per 100 parts rubber, but is preferably from about 45 to about 90 parts by weight.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica might also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s), for this invention, if used, are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 6, sometimes from 3 to 6, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with silica coupling agents of the organosilylpolysulfide type and mercaptobenzothiazole or its derivatives.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this example, 2-mercaptobenzothiazole is evaluated in combination with a silica coupling agent, namely, bis-(3-triethoxysilylpropyl)tetrasulfide, in carbon black and silica reinforced rubber composition.

Rubber compositions containing the materials set out in Tables 1 and 2 were prepared in a BR Banbury mixer using three separate stages of addition (mixing), namely, two non-productive mix stages and one productive mix stage to temperatures of 160° C., 160° C. and 120° C. and times of 4 minutes, 4 minutes and 2 minutes, respectively. The amount of coupler is listed as being "variable" in Table 1 and is more specifically set forth in Table 2.

The rubber compositions are identified herein as Samples A, B, C and D. Sample A is considered herein as being a control without the use of a silica coupler or 2-mercaptobenzothiazole added during the non-productive mixing stage.

The Samples were cured at about 150° C. for about 36 minutes.

Table 2 illustrates the behavior and physical properties of the cured Samples A, B, C and D.

It is clearly evident from the results that the 2-mercaptobenzothiazole in combination with the coupling agent (Sample D) results in higher modulus, rebound and stiffness properties.

When the 2-mercaptobenzothiazole was added during the non-productive mixing in the absence of the organosilane tetrasulfide (Sample C), improvement in rubber properties compared to the control sample (Sample A) were marginal.

The 2-mercaptobenzothiazole added in the non-productive mix stage together with the silica and silica coupler (Sample D) is observed to provide larger improvements in these properties than a conventional bis-(3-triethoxysilylpropyl)tetrasulfide silica coupling agent added alone (Sample B).

This is considered an advantage because it suggests that rubber properties equivalent to those achieved when utilizing the organosilane coupler in the rubber/silica mixture might be achieved with less of the organosilane coupler and/or using less mixing time in the internal rubber mixer.

TABLE 1

| 1st Non-Productive | |
|---|---|
| NAT 2200 Rubber[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |
| 2nd Non-Productive | |
| Silica[3] | 15.00 |
| Bis-(3-triethoxylsilylpropyl) tetrasulfide[4] | variable |
| 2-Mercaptobenzothiazole | variable |
| Productive | |
| Sulfur | 1.40 |
| Accelerator, sulfenamide type[5] | 1.00 |

[1]synthetic cis 1,4-polyisoprene rubber from The Goodyear Tire & Rubber Company;
[2]of the polymerized 1,2-dihydro-2,2,4-trimethyldihydroquinoline type;
[3]silica obtained as Hi-Sil 210 from PPG Industries, Inc.;
[4]obtained as bis-(3-triethoxysilylpropyl)tetrasulfide, commercially available as X50S from Degussa GmbH which is provided in a 50/50 blend with carbon black and, thus, considered as being 50% active when the blend is considered; and
[5]N-tert-butyl-2-benzothiazole sulfenamide.

TABLE 2

| Sample # | A | B | C | D |
|---|---|---|---|---|
| Bis-(3-triethoxysilylpropyl) tetrasulfide (50% active) | 0 | 3.0 | 0 | 3.0 |
| 2-mercaptobenzothiazole | 0 | 0 | 0.5 | 0.5 |
| Rheometer (150° C.) | | | | |
| Max. Torque | 27.2 | 33.0 | 29.3 | 44.0 |
| Min. Torque | 5.3 | 5.2 | 4.4 | 5.5 |
| Delta Torque | 21.9 | 27.8 | 24.9 | 39.5 |
| $T_{90}$, minutes | 23.0 | 19.3 | 12.3 | 29.5 |
| $T_{25}$, minutes | 17.8 | 13.3 | 8.0 | 8.0 |
| Stress-Strain | | | | |
| Tensile Strength, MPa | 12.8 | 19.1 | 16.6 | 22.2 |
| Elongation at Break, % | 626 | 615 | 664 | 538 |
| 100% Modulus, MPa | .93 | 1.62 | 1.1 | 2.72 |
| 300% Modulus, MPa | 3.9 | 7.53 | 4.77 | 11.9 |
| Rebound | | | | |
| 100° C., % | 52.2 | 57.8 | 54.1 | 61.1 |
| Hardness | | | | |
| 100° C. | 40.1 | 50.2 | 42.5 | 61.2 |
| Rheovibron | | | | |
| E' at 60° C., MPa | 10.6 | 12.3 | 10.4 | 16.7 |
| Tan Delta at 60° C. | 0.127 | 0.100 | 0.123 | 0.070 |

EXAMPLE II

A rubber composition, identified herein as Sample E, containing the materials shown in Table 3 was prepared in a BR Banbury mixer using three separate stages of addition, thus, two successive non-productive mix stages followed by a productive mix stage to temperatures of about 160° C., 160° C., and 120° C. and times of about 4, 4, and 2 minutes, respectively.

The Sample contained 70 parts silica and 20 parts carbon black.

The Sample was cured at a temperature of about 50° C. for about 36 minutes.

The cure behavior and cured properties of Sample E are shown in Table 4. Excellent cure behavior and good modulus, rebound and abrasion properties are demonstrated in this Example.

TABLE 3

| 1st Non-Productive | |
|---|---|
| SBR 1712 Rubber[1] | 68.75 |
| BUD 1207 Rubber[2] | 15 |
| NAT 2200 Rubber[3] | 35 |
| Carbon Black | 20 |
| Silica[4] | 40 |
| Zinc Oxide | 3 |
| Fatty Acid | 3 |
| Antioxidant[5] | 2 |
| Processing Aid[6] | 5 |
| Bis-(3-triethoxylsilylpropyl) tetrasulfide[7] | 2 |
| 2nd Non-Productive | |
| Silica[4] | 30 |
| Bis-(3-triethoxylsilylpropyl) tetrasulfide[7] | 2 |
| 2-Mercaptobenzothiazole | 0.25 |
| Productive | |
| Sulfur | 2.50 |

TABLE 3-continued

| Accelerators, | |
|---|---|
| Sulfenamide type[8] | 3 |
| Diphenylguanidine | 2 |

[1]styrene/butadiene copolymer rubber with 37 phr aromatic oil and 23.5 percent styrene and, based on 100 parts by weight thereof, it is composed of 100 parts by weight rubber and 37.5 parts by weight aromatic oil; from The Goodyear Tire & Rubber Company;
[2]cis 1,4-polybutadiene rubber from The Goodyear Tire & Rubber Company;
[3]synthetic cis 1,4-polyisoprene rubber from The Goodyear Tire & Rubber Company;
[4]Zeosil 1165MP from Rhone-Poulenc;
[5]of the polymerized 1,2-dihydro-2,2,4-trimethyldihydroquinoline type;
[6]Struktol A6;
[7]obtained as bis-(3-triethoxysilylpropyl) tetrasulfide, commercially available as X50S from Degussa GmbH which is provided in a 50/50 blend with carbon black and, thus, considered as being 50% active when the blend is considered; and
[8]N-tert-butyl-2-benzothiazole sulfenamide.

TABLE 4

| Rheometer (150° C.) | |
|---|---|
| Max. Torque | 60.5 |
| Min. Torque | 15.2 |
| Delta Torque | 45.3 |
| $T_{90}$, minutes | 10.8 |
| Stress-Strain | |
| Tensile Strength, MPa | 14.3 |
| Elongation at Break, % | 273 |
| 100% Modulus, MPa | 4.7 |
| Rebound | |
| 100° C., % | 60.7 |
| Hardness | |
| Shore A, 100° C. | 73.2 |
| DIN Abrasion | 141 |

EXAMPLE III

In this Example, (Table 5) 2-mercaptobenzothiazole is evaluated in combination with X50S coupling agent in a rubber composition containing 80 phr Zeosil MP1165 silica and 6.4 phr carbon black. The carbon black is contained within the X50S coupling agent. The Samples (F, G, H, I) of this Example were mixed in a BR Banbury using a two-stage mix procedure. The first, or non-productive stage, was mixed for various time periods at a temperature of 160°. This stage which as referred to as a "heat treatment" step is required to achieve the proper "coupling" between diene elastomer and silica through the presence of the X50S coupling agent. This "heat treatment" time period is required to achieve optimum cured properties, such as modulus, rebound and abrasion resistance. In this Example, benzothiazyl disulfide was also evaluated (Sample J) in combination with X50S coupling agent.

The control compound Sample F contained only X50S coupling agent during the heat treatment step. Samples G, H and I contained 0.4, 0.8 and 1.2 phr, respectively, 1% 2-mercaptobenzothiazole present during this mixing stage in addition to the X50S coupling agent. A steady improvement in properties (Table 6) is observed as the amount of 2-mercaptobenzothiazole was increased. These results clearly indicate that the mixing time during the non-productive mixing stage or stages can be reduced by the addition of 2-mercaptobenzothiazole during the mixing stage. Sample J also indicates that benzothiazole disulfide can be used in a likewise manner.

The time of mixing was reduced from 7 minutes to 1 minute of mixing time. Tremendous savings in time and energy would result from this method of mixing silica containing rubber compounds.

TABLE 5

| Sample # | F | G | H | I | J |
|---|---|---|---|---|---|
| Non-Productive Stage | | | | | |
| Natural Rubber | 10 | 10 | 10 | 10 | 10 |
| BUD 1207[1] | 20 | 20 | 20 | 20 | 20 |
| Isoprene/Butadiene Copolymer[2] | 45 | 45 | 45 | 45 | 45 |
| Emulsion SBR-OE[3] | 25 | 25 | 25 | 25 | 25 |
| Zeosil MP1165 | 80 | 80 | 80 | 80 | 80 |
| Degussa X50S (50% active) | 12.8 | 12.8 | 12.8 | 12.8 | 12.8 |
| Processing Oil & Wax | 28 | 28 | 28 | 28 | 28 |
| Fatty Acid | 3 | 3 | 3 | 3 | 3 |
| 2-Mercapto-benzothiazole | 0 | 0.4 | 0.8 | 1.2 | 0 |
| Benzothiazyldisulfide | 0 | 0 | 0 | 0 | 0.8 |
| Temperature | 160° C. | 160° C. | 160° C. | 160° C. | 160° C. |
| Mixing Time | 7 min | 1 min | 1 min | 1 min | 1 min |
| Productive Stage | | | | | |
| Antidegradants | 3 | 3 | 3 | 3 | 3 |
| Sulfenamide Accelerator[4] | 1.7 | 1.7 | 1.7 | 1.7 | 1.7 |
| Diphenylguanidine | 2 | 2 | 2 | 2 | 2 |
| Sulfur | 1.4 | 1.4 | 1.4 | 1.4 | 1.4 |
| Zinc Oxide | 2.5 | 2.5 | 2.5 | 2.5 | 2.5 |
| Temperature | 120° C. | 120° C. | 120° C. | 120° C. | 120° C. |
| Mixing Time | 2 min | 2 min | 2 min | 2 min | 2 min |

[1]cis 1,4-polybutadiene from The Goodyear Tire & Rubber Company;
[2]copolymer of isoprene and butadiene containing 50% isoprene and 50% butadiene having a glass transition temperature, (Tg) of −45° C.;
[3]emulsion polymerized styrene/butadiene copolymer containing 40% bound styrene; and
[4]N-tert-butyl-2-benzothiazole sulfenamide.

TABLE 6

| Sample # | F | G | H | I | J |
|---|---|---|---|---|---|
| 2-Mercapto-benzothiazole | 0 | 0.4 | 0.8 | 1.2 | 0 |
| Benzothiazyl-disulfide | 0 | 0 | 0 | 0 | 0.8 |
| Mixing Time at 160° C. | 7 | 1 | 1 | 1 | 1 |
| Rheometer, 150° C. | | | | | |
| Max. Torque | 40.8 | 47.8 | 49.3 | 50.8 | 47.5 |
| Min. Torque | 13.0 | 15.5 | 16.5 | 16.0 | 14.9 |
| Delta Torque | 27.8 | 32.3 | 32.8 | 34.8 | 32.6 |
| $T_{90}$, min | 10.0 | 11.7 | 9.2 | 9.0 | 10.5 |
| Stress-Strain | | | | | |
| Tensile Strength, MPa | 18.0 | 16.6 | 15.8 | 17.1 | 15.8 |
| Elongation at Break, % | 449 | 419 | 357 | 354 | 373 |
| $M_{100}$, MPa | 2.44 | 3.08 | 3.47 | 3.73 | 3.19 |
| $M_{300}$, MPa | 11.93 | 12.50 | 14.29 | 15.55 | 13.53 |
| Rebound 100° C., % | 63.8 | 60.3 | 61.6 | 62.7 | 61.0 |
| Hardness 100° C., % | 63 | 71 | 71 | 72 | 71 |
| DIN Abrasion | 101 | 113 | 105 | 104 | 115 |

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a rubber composition by a process consisting of at least two sequential mixing steps which comprises the sequential steps of:
   (A) thermomechanically mixing in at least one individual preparatory mixing step, in the absence of sulfur and sulfur vulcanization accelerators except as hereinafter provided, at a temperature in a range of about 140° C. to about 190° C. for a total mixing time of about 4 to about 20 minutes
       (i) 100 parts by weight of at least one sulfur vulcanizable elastomer selected from conjugated diene homopolymers and copolymers and from copolymers of at least one conjugated diene and aromatic vinyl compound,
       about 15 to about 100 phr of particulate precipitated silica,
       (ii) about 0.01 to about 0.2 parts by weight per part by weight of said silica of a bis-(3-trialkoxysilylalkyl)polysulfide where the sulfide bridge portion contains 2 to 8 connecting sulfur atoms in which the average polysulfide bridge contains about 4.5 to about 5.5 sulfur atoms and in which at least 75 percent of the polysulfide bridge portion contains at least 3 sulfur atoms, and
       (iv) about 0.01 to about one part by weight of at least one of 2-mercaptobenzothiazole, benzothiazyl disulfide and N,N'-di, or N-mono, substituted 2-benzothiazole sulfenamides wherein the substituents are selected from cyclohexyl, tertiary butyl, and isopropyl groups per part of said bis-(3-trialkoxysilylalkyl)polysulfide;
   (B) subsequently blending therewith in a final, individual thermomechanical mixing step at a temperature in a range of about 100° C. to about 130° C. for a time of about 1 to about 3 minutes, about 0.5 to about 8 phr elemental sulfur and at least one sulfur vulcanization accelerator, provided, however, that the total of sulfur vulcanization accelerator added to the rubber mixture, including the aforesaid 2-mercaptobenzothiazole added in a preparatory mixing stage(s) is in a range of about 0.5 to about 5 phr.

2. A rubber composition prepared according to the method of claim 1 comprised of (A) 100 parts by weight of at least one diene-based elastomer, (B) about 25 to about 90 phr particulate silica, (C) up to about 80 phr carbon black, (D) a bis-(3-triethoxysilylpropyl)polysulfide silica coupler and (E) 2-mercaptobenzothiazole; wherein the weight ratio of said silica coupler to silica is in a range of about 0.01/1 to about 0.2/1; wherein the weight ratio of silica to carbon black is at least about 0.1/1 and wherein the total of silica and carbon black is in a range of about 30 to about 120.

3. A tire having a tread of the composition of claim 2.

4. The method of claim 1 which comprises the additional step of vulcanizing the prepared rubber composition at a temperature in a range of about 135° C. to about 180° C.

5. The vulcanized rubber composition according to the method of claim 4.

6. The method of claim 1 which comprises the additional steps of preparing an assembly of a tire of sulfur vulcanizable rubber with a tread of the said rubber composition and vulcanizing the assembly at a temperature in a range of about 135° C. to about 180° C.

7. A vulcanized tire prepared according to the method of claim 6.

8. The composition of claim 2 where the sulfur vulcanization accelerator is 2-mercaptobenzothiazole and where the weight ratio of silica to carbon black is at least 3/1.

9. The composition of claim 8 where the weight ratio of silica to carbon black is in a range of 3/1 to 30/1.

10. The method of claim 6 where the sulfur vulcanization accelerator is 2-mercaptobenzothiazole and in which carbon black is also added for which the ratio of silica to carbon black in the tread composition is at least 3/1.

11. A vulcanized tire prepared according to the method of claim 10.

* * * * *